United States Patent [19]
Schmitt

[11] Patent Number: 5,031,306
[45] Date of Patent: Jul. 16, 1991

[54] ASSEMBLY TURRET WITH UNIVERSAL NESTS

[75] Inventor: Werner H. Schmitt, Falls Church, Va.

[73] Assignee: Hoppmann Corporation, Chantilly, Va.

[21] Appl. No.: 611,090

[22] Filed: Nov. 9, 1990

[51] Int. Cl.⁵ .............................................. B23P 21/00
[52] U.S. Cl. ......................................... 29/785; 29/792
[58] Field of Search ................................. 29/785, 792

[56] References Cited
U.S. PATENT DOCUMENTS

| | | | |
|---|---|---|---|
| 2,672,630 | 3/1954 | Bitzer et al. | 29/792 X |
| 4,498,234 | 2/1985 | Greslin et al. | 29/785 |
| 4,873,760 | 10/1989 | Watanabe et al. | 29/792 X |

Primary Examiner—Timothy V. Eley
Assistant Examiner—C. Richard Martin

[57] ABSTRACT

An assembly turret with universal nests comprises a first turret wheel having a central axis and an outer peripheral surface. A first set of a plurality of pockets is disposed on the outer peripheral surface of the first turret wheel. The first set of a plurality of pockets each includes an opening of a first article locating portion for permitting an article to be radially received therein from the outer peripheral surface through the opening and into the first article locating portion. A second turret wheel is provided with a central axis and an outer peripheral surface. A second set of a plurality of pockets is disposed on the outer peripheral surface of the second turret wheel. The second set of a plurality of pockets each includes an opening and a second article locating portion for permitting an article to be radially received therein from the outer peripheral surface through the opening and into the second article locating portion. The first and second turret wheels are concentrically mounted adjacent to each other for rotation as a unit. Adjusting means are included for adjusting the positioning of the first and second turret wheels relative to each other for aligning a first particular article positioned within the first article locating portion relative to a second particular article positioned within the second article locating portion for enabling nesting and assembly of the first and second articles relative to each other.

12 Claims, 4 Drawing Sheets

ASSEMBLY TURRET WITH UNIVERSAL NESTS

BACKGROUND OF THE INVENTION

1. Field of the Invention

The present invention is directed to an assembly turret with a universal nest for receiving and positioning articles relative to each other for assembly.

2. Description of Background Art

Hithertofore, turret assemblies have been manufactured to perform a specific work process on an object which has a predetermined size. As the size of the object is varied, a new turret or nests assembly may be required. The turret assemblies are built on the basis that they are capable of being changed over to assemble other parts of similar configuration on the same machine. In most instances, the changeover requires that the machine must be provided with extra product component part holding fixtures or nests. The holding fixtures or nests and guides are specifically built to accommodate other product component parts of different sizes. The extra holding fixtures or nests must be stored in a location away from the machine while the extra holding fixtures or nests and guides are not in use. Thus, there is a chance of damage or loss of the extra holding fixtures or nests. Furthermore, replacing or exchanging the holding fixtures or nests is often a very time-consuming process which requires exacting settings and other complicated procedures.

With our modern age of industrial automation, it has reached the stage where many manufacturing processes are conducted with a minimal amount of human labor and/or intervention. In addition, the automated processes operate at a much higher speed and produce an output capacity which is greater than the output capacity obtained with manual labor. The end product is characterized by a uniform quality with a reduced waste due to the fact that the parts are manufactured by the same method. Productivity is greatly enhanced due to automation.

One of the shortcomings of automation relates to the high cost of purchasing automated machinery. Machinery and systems which are dedicated to processing only one product may require a considerable amount of capital investment. The machinery must be utilized over an extended period of time in order to fully amortize the cost of the machinery.

SUMMARY AND OBJECTS OF THE INVENTION

It is an object of the present invention to provide an assembly turret with universal nests for permitting a variety of different size articles to be assembled relative to each other.

A further object of the present invention is to provide an assembly turret with universal nests which may be easily adjusted relative to each other to accommodate different size articles.

A further object of the present invention is to provide an assembly turret with universal nests which permit an article to be readily positioned within a pocket for orienting the article relative to a second article for assembly.

These and other objects of the present invention are achieved by providing an assembly turret with universal nests having a first turret wheel with a central axis and an outer peripheral surface. A first set of a plurality of pockets is disposed on the outer peripheral surface of the first turret wheel. The first set of a plurality of pockets each includes an opening and a first article locating portion for permitting an object to be radially received therein from the outer peripheral surface through the opening and into the first article locating portion. A second turret wheel includes a central axis and an outer peripheral surface. A second set of a plurality of pockets is disposed on the outer peripheral surface of the second turret wheel. The second set of a plurality of pockets each includes an opening and a second article locating portion for permitting an article to be radially received therein from the outer peripheral surface through the opening and into the second article locating portion. The first and second turret wheels are concentrically mounted adjacent to each other for rotation as a unit. An adjusting member is provided for adjusting the positioning of the first and second turret wheels relative to each other for aligning a first particular article positioned within the first article locating portion relative to a second particular article positioned within the second article locating portion for enabling nesting and assembly of the first and second articles relative to each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
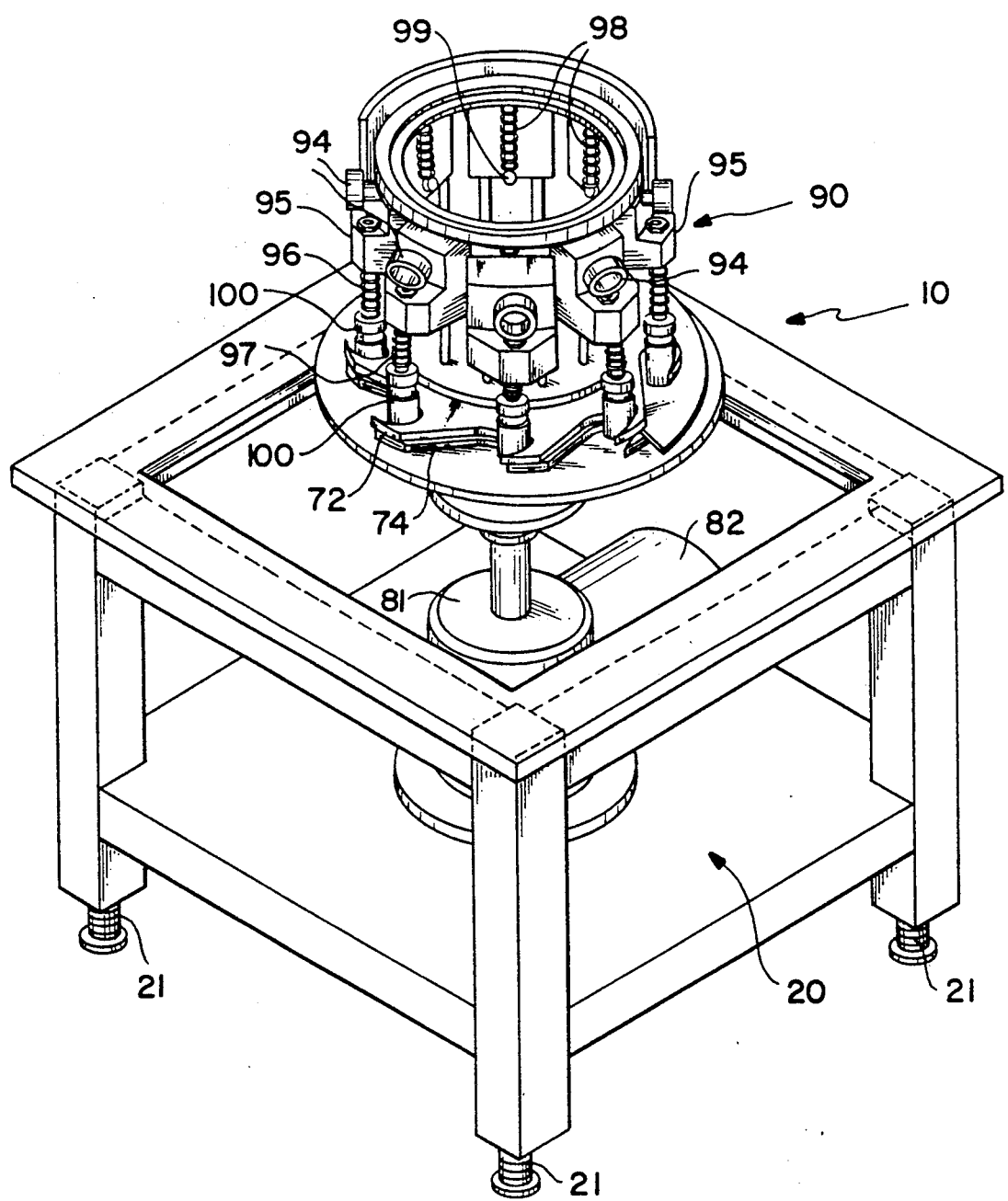
FIG. 1 is a perspective view illustrating a multi-purpose turret assembly for which the assembly turret with universal nests according to the present invention is utilized.
Figure 2:
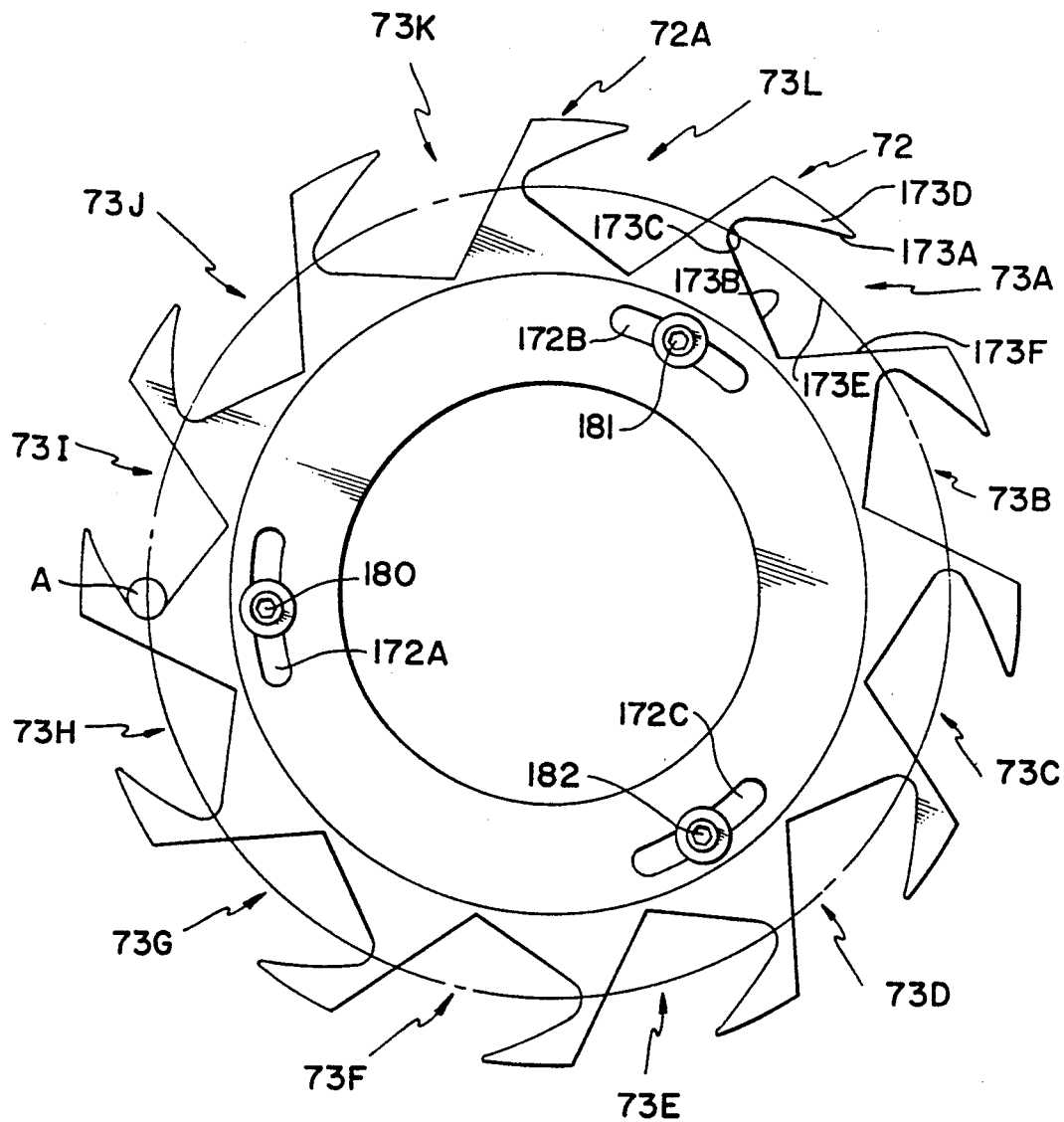
FIG. 2 is a top plan view of a first turret wheel of the assembly turret.
Figure 3:
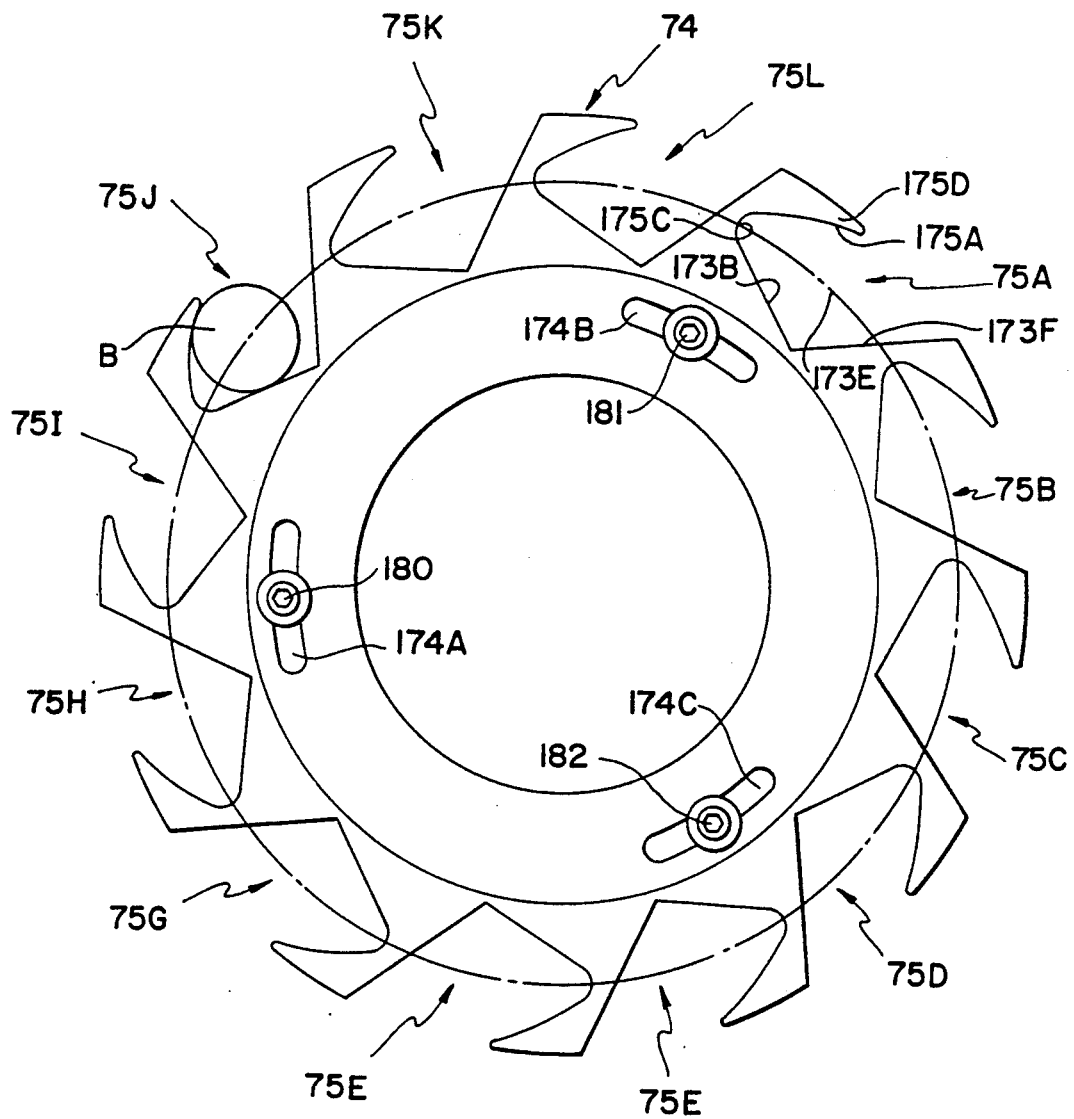
FIG. 3 is a top plan view of a second turret wheel of the assembly turret.

As illustrated in FIG. 1, a self-contained exchangeable turret assembly 10 includes a support structure 20 and a turret module 90. The support structure 20 and the turret module 90 are designed to be readily connected to and detached from each other to permit an individual to readily change the turret module 90 to accommodate various size, shape and configuration work pieces. In addition, the assembly turret with universal nests may be easily adjusted relative to each other in order to accommodate various size, shape and configuration work pieces without the necessity of actually removing the entire turret module 90.

The support structure 20 includes adjustable legs 21 for accurately mounting the support structure 20 relative to the floor in a work place. Within the support structure 20 is positioned a motor 82 which includes a motor output shaft. The motor output shaft is connected to a reducer 81. A coupling is operatively connected by means of bolts or other fasteners to a reducer output shaft connected to the reducer 81.

The turret module 90 includes a turret drive shaft connected to the coupling for imparting rotating thereto.

A first turret wheel 72 is mounted adjacent to a second turret wheel 74. The first turret wheel 72 and the second turret wheel 74 are concentrically arranged relative to each other and rotate on a common shaft. A receiving shelf is mounted between the first turret wheel 72 and the second turret wheel 74 over a predetermined portion thereof to separate articles disposed within the first turret wheel 72 from articles disposed within the second turret wheel 74 until the articles are at a predetermined location for assembly.

The turret module 90 includes a plurality of work tools mounted around the second turret wheel 74. Legs are provided for affixing the tool turret module 90 relative to the second turret wheel 74. A pair of legs are mounted adjacent to each work tool in order to guide a slide housing 95 which is movable up and down on the legs as the turret module 90 rotates together with the turret drive shaft.

The work tools include the slide housing 95 and a cam follower 94. A rod 96 is mounted for reciprocation within the slide housing 95. A spring 97 guides the movement of the rod 96 and returns the rod to a predetermined position after a work tool engaging member 100 engages a first work piece mounted within a pocket of a first turret wheel 72. In addition, a return spring 98 is connected to a pin 99 which is secured to the slide housing 95 to return the slide housing 95 to a disengaged position after the work tool engaging member 100 completes the work on a work piece.

As illustrated in FIGS. 2-5, the present invention is directed to the turret assembly with a universal nest 70. The assembly turret with universal nest 70 includes a first turret wheel 72 and a second turret wheel 74. The first turret wheel 72 includes a plurality of pockets 73A, 73B, 73C, 73D, 73E, 73F, 73G, 73H, 73I, 73J, 73K, and 73L mounted around an outer peripheral surface 72A of the first turret wheel 72. Each pocket 73A-73L includes an article engaging arm 173A and an article engaging surface 173B. The first article engaging arm 173A is disposed adjacent to the first article engaging surface 173B for providing an article locating portion 173C therebetween. A first projecting flange 173D is mounted adjacent to the outer peripheral surface of the first turret wheel 72. An opening 173E is provided to permit an article to pass into the space formed between the first article engaging arm 173 and the first article engaging surface 173B to position the article in the first article locating portion 173C. An article guide surface 173F is provided for guiding an object to be positioned within the pocket 73A and disposed between the first article engaging arm 173A and the first article engaging surface 173B. Each of the pockets 73A-73L are provided with a first article engaging arm, a first article engaging surface and an article locating portion being disposed therebetween. For the sake of brevity, the references numerals for each of the first article engaging arms, first article engaging surfaces and first article locating portions will not be provided in the drawings.

Similarly, the second turret wheel 74 includes a plurality of pockets 75A-75L mounted around the outer peripheral surface 74A of the second turret wheel 74. Each of the pockets 75A-75L includes a second article engaging arm 175A and a second article engaging surface 175B. The second article engaging arm 175A and the second article engaging surface 175B are mounted relative to each other to form an article locating portion 175C therebetween. A projecting flange 175D is disposed adjacent to the article engaging arm 175A on the outer peripheral surface 74A of the second turret wheel 74. An opening 175E is formed to permit an article to be positioned within the pocket 75A and to be disposed within the article locating portion 175C. An article guide surface 175F is provided to guide an object so as to enter into the opening in the pocket and to be positioned in the article locating portion 175C.

Figure 4:
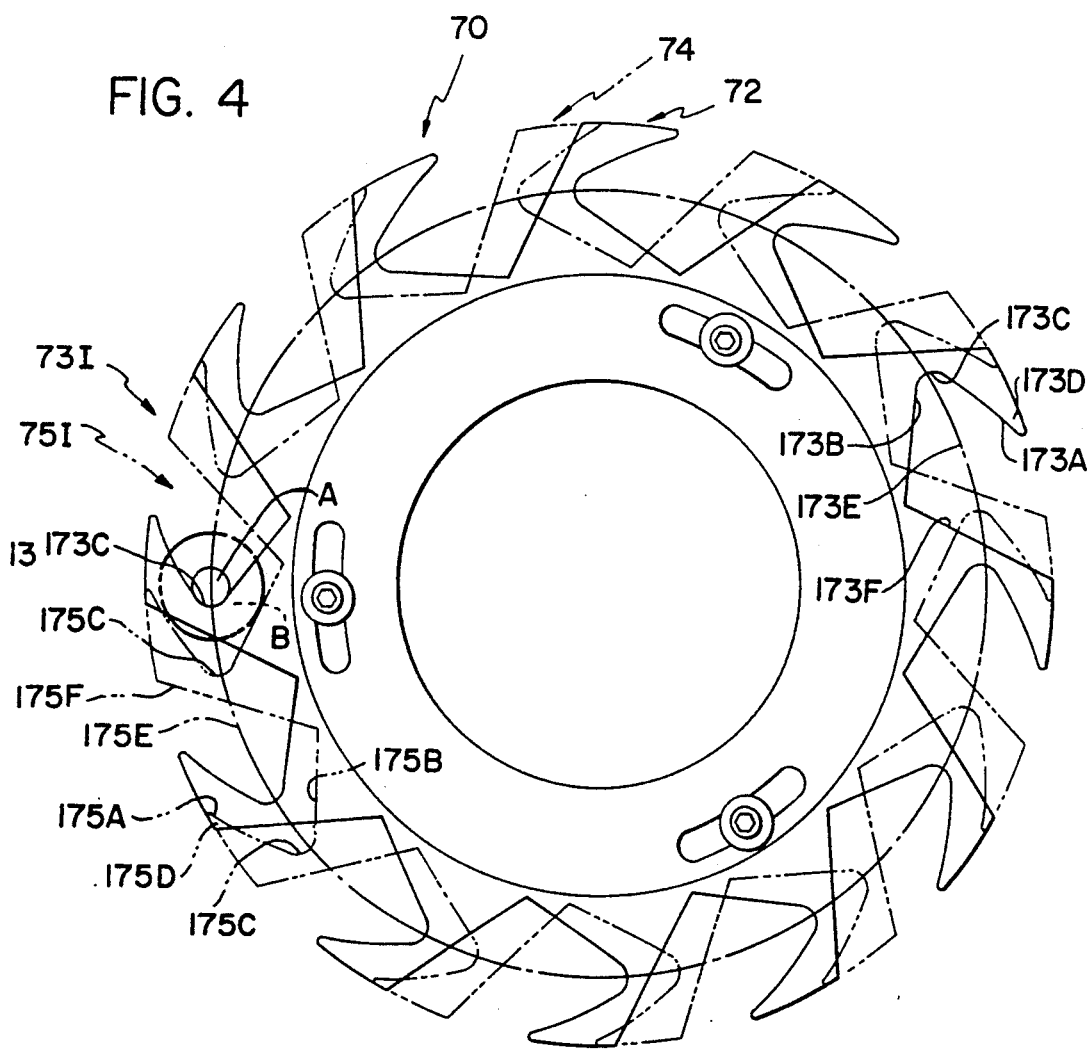
FIG. 4 is a top plan view of an assembly turret with universal nests according to the present invention.

As illustrated in FIG. 4, slots 172A, 172B and 172C are provided in the first turret wheel 72. Similarly, slots 174A, 174B and 174C are provided in the second turret wheel 74. Retaining members 180, 181 and 182 are provided to retain the first turret wheel 72 relative to the second turret wheel 74. The positioning of the first turret wheel 72 relative to the second turret wheel 74 may be adjusted by moving the first turret wheel 72 relative to the second turret wheel 74 so that the retaining members 180, 182 and 183 permit movement of the first turret wheel 72 relative to the second turret wheel 74. After the specific location of the first turret wheel 72 is obtained relative to the second turret wheel 74, the retaining members 180, 181 and 182 may be secured to retain the first turret wheel 72 in a predetermined relationship relative to the second turret wheel 74. The retaining members 180, 181 and 182 may be adjusting screws.

Figure 5:
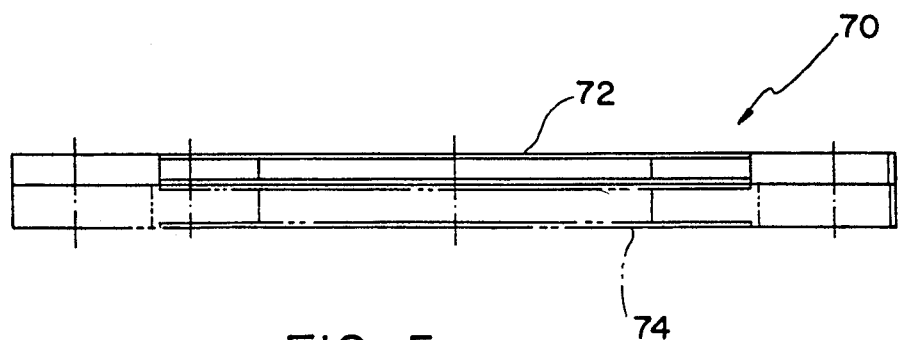
FIG. 5 is a cross-sectional view of the assembly turret with universal nests as illustrated in FIG. 4.

As illustrated in FIG. 5, the first turret wheel 72 is mounted concentric with the second turret wheel 74. Articles are disposed within pockets in the first turret wheel 72 to be aligned relative to articles disposed within the pockets in the second turret wheel 74.

Referring to FIG. 4, a first article A is positioned within the article locating portion 173C of the pocket 73I. Similarly, an article B is disposed within the article locating portion 175C of the pocket 75I. The pockets are aligned relative to each other so as to permit alignment of the article A relative to the article B. In this way, the article A may be assembled relative to the article B as the assembly turret with universal nests rotate.

The assembly turret with universal nests may be provided with two or more wheels of a given pitch diameter which are constructed with a given number of pockets or nests. The nests are specifically designed with a configuration having a geometry which allows round product component parts of different diameters to be located on the same pitch diameter relative to the assembly turret with only a change in phase from one wheel to the next. Since all wheels possess the same configuration of nests, the product component parts may be aligned for assembly within the turret by simply adjusting the phase relationship of the wheels and locking them into position. Since the pocket configuration is such that the article is contained on the outer side of travel, no setting with regard to other parts of the assembly turret are required.

In order to adjust the phasing to assemble different product component parts, clamp screws fixing the position of the wheels may be loosened. Thereafter, the wheels would be rephased to a new setting by moving the wheels with respect to each other. Thereafter, the wheels would be locked in a new position. This adjustment completes the phasing adjustment to ready the assembly turret to assemble different product component parts.

The present invention enables the use of an assembly turret without the need to use guides for retaining an object relative to the pockets or nests. More specifically, the use of article engaging arm, article engaging surface and article locating portion permits an article to be retained relative thereto without the use of further guides for retaining an article relative to the turret wheels. In addition, the first or second turret wheel may include a slot disposed therein for permitting a stripper member to be inserted therein for selectively removing an article from the first or second turret wheel.

The arrangement according to the present invention would greatly simplify the task of assembly turret retooling and provides advantages due to the simplification of the change-over technique. In addition, a reduction of the physical number of pieces required for changing tooling from those normally required would be achieved according to the present invention. Further, the present invention would save time when compared to the normal nest set replacements of conventional assembly turrets.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An assembly turret with universal nests comprising:
    a first turret wheel having a central axis and an outer peripheral surface;
    a first set of a plurality of pockets being disposed on the outer peripheral surface of said first turret wheel, said first set of a plurality of pockets each including an opening and a first article locating portion for permitting an article to be radially received therein from the outer peripheral surface through the opening and into the first article locating portion;
    a second turret wheel having a central axis and an outer peripheral surface;
    a second set of a plurality of pockets being disposed on the outer peripheral surface of said second turret wheel, said second set of a plurality of pockets each including an opening and a second article locating portion for permitting an article to be radially received therein from the outer peripheral surface through the opening and into the second article locating portion;
    said first and second turret wheels being concentrically mounted adjacent to each other for rotation as a unit;
    adjusting means for adjusting the positioning of said first and second turret wheels relative to each other for aligning a first particular article positioned within said first article locating portion relative to a second particular article positioned within said second article locating portion for enabling nesting and assembly of said first and second articles relative to each other.

2. The assembly turret with universal nests according to claim 1, wherein said first set of a plurality of pockets further includes a first article engaging arm and a first article engaging surface, said first article engaging arm and said first article engaging surface being positioned adjacent to each other for forming a first article locating portion therebetween.

3. The assembly turret with universal nests according to claim 2, wherein said first article engaging arm and said first article engaging surface form an acute angle therebetween.

4. The assembly turret with universal nests according to claim 2, and further including a first projecting flange mounted adjacent to said first article engaging arm for assisting in the locating of a first article within said first article locating portion.

5. The assembly turret with universal nests according to claim 2, and further including a first article guide surface mounted adjacent to said first article engaging surface for guiding and assisting in the locating of a first article within said first article locating portion.

6. The assembly turret with universal nests according to claim 1, wherein said second set of a plurality of pockets further includes a second article engaging arm and a second article engaging surface, said second article engaging arm and said second article engaging surface being position adjacent to each other for forming a second article locating portion therebetween.

7. The assembly turret with universal nests according to claim 6, wherein said second article engaging arm and said second article engaging surface form an acute angle therebetween.

8. The assembly turret with universal nests according to claim 6, and further including a second projecting flange mounted adjacent to said second article engaging arm for assisting in the locating of a second article within said second article locating portion.

9. The assembly turret with universal nests according to claim 6, and further including a second article guide surface mounted adjacent to said second article engaging surface for guiding and assisting in the locating of a second article within said second article locating portion.

10. The assembly turret with universal nests according to claim 1, wherein said adjusting means includes at least one first slot formed in said first turret wheel and at least one second slot formed in said second turret wheel, said first and second slots being aligned and adjusted relative to each other for adjusting the disposition of said first article locating portion relative to said second article locating portion, and retaining means for maintaining the aligned and adjusted positioning.

11. The assembly turret with universal nests according to claim 10, wherein one or more first slots are formed in said first turret wheel and one or more second slots are formed in said second turret wheel for aligning and adjusting the positioning of said first and second turret wheels relative to each other.

12. The assembly turret with universal nests according to claim 1, wherein a plurality of first pockets are formed around the outer peripheral surface of said first turret wheel and a plurality of second pockets are formed around the outer peripheral surface of said second turret wheel.

* * * * *